INVENTOR
ALFRED LERBS
BY Hoseltine, Lake & Co.
AGENTS

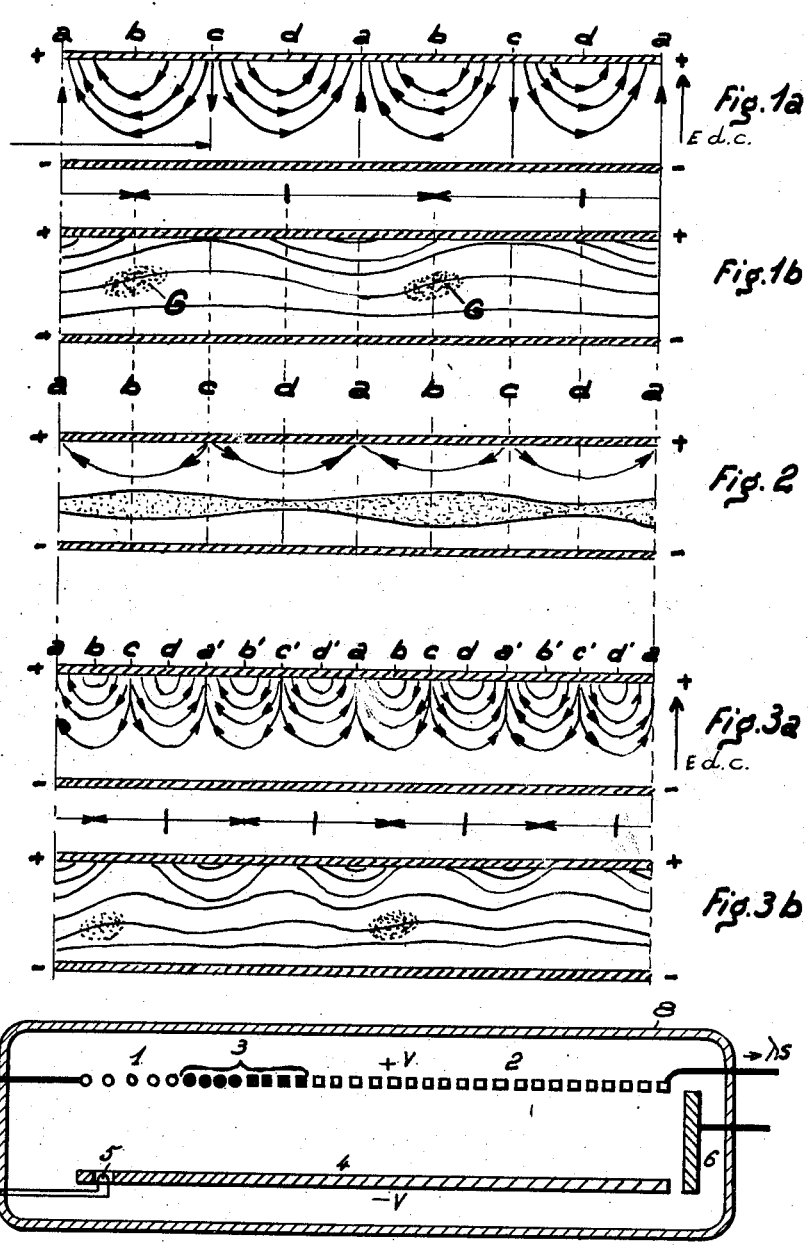

United States Patent Office 2,807,744
Patented Sept. 24, 1957

2,807,744

TRAVELLING WAVE MAGNETRON TUBES

Alfred Lerbs, Paris, France, assignor to Compagnie Generale de Telegraphie Sans Fil, a corporation of France Application July 11, 1952, Serial No. 298,367

Claims priority, application France July 27, 1951

11 Claims. (Cl. 315—3.6)

This invention relates to travelling wave magnetron tubes and has for its object to provide improved tubes of this type adapted for use as frequency multipliers.

A known form of amplifier for decimetric and centimetric waves is the so-called travelling wave tube in which a wave fed into a delay line is amplified by interaction with an electron beam which is propagated in a direction parallel to said line and at right angles to crossed electric and magnetic fields, and at a speed equal to the ratio of these two fields and to the phase propagation speed of the wave, these different quantities being expressed in terms of harmonizing units.

The present invention provides a tube of this type which functions as a frequency multiplier. To this end, the delay line is divided into two sections, the first of which is traversed by a wave of the fundamental frequency to be multiplied and the two sections and the potentials applied to the system are so dimensioned and disposed that the speed of the beam is equal to the phase speed of the fundamental wave in the first section and to the phase speed of a desired harmonic wave in the second section. In these circumstances the desired harmonic wave is excited in the second section and may be collected from the output circuit, whereas the fundamental wave cannot be excited in the second section in consequence of dispersion.

Frequency multiplication is effected, in an arrangement in accordance with the invention, over a wide frequency band, with a high electronic efficiency, and with a high output power. These advantages are not simultaneously obtained in any other type of travelling wave tube, for example the known type of tube without transverse magnetic field in which, if the delay line were divided into two sections for the purpose of functioning as a multiplier as in the present invention, neither a high efficiency nor a high amplification would be obtained, for, with that type of tube the efficiency is already very low even for simple amplification while the electronic mechanism is very much disturbed by space charge effects. The type of tube utilised in carrying out the present invention is, on the contrary, characterised by a considerable electronic efficiency and by an operation which, within fairly wide limits, is not troubled by the influence of the space charge.

The invention is illustrated in and explained in connection with the accompanying drawings:

Figures 1a, 1b, and 2 are diagrams explanatory of the operation of the tube functioning as an amplifier.

Figures 3a and 3b are similar diagrams for the operation of a similar tube as frequency multiplier.

Figures 4 to 8 show possible forms of construction of tubes adapted to function as multipliers, Figs. 4-7 being axial sections and Fig. 8 a cross-section.

Figure 5A:
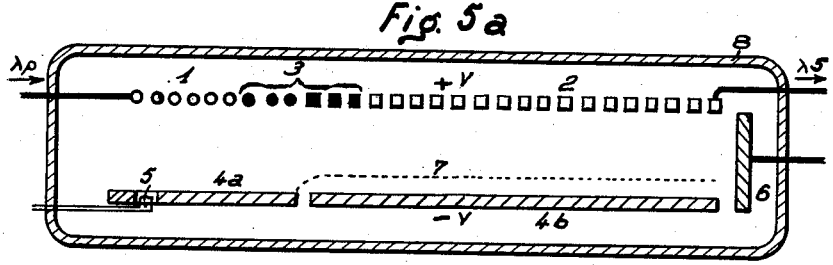

In order to understand the electronic mechanism of frequency multiplication, that of simple amplification will first be reviewed with reference to Figures 1a and 1b, which indicate respectively the lines of force and equipotentials of the electric field in the presence of the high frequency wave in the known tube briefly described at the beginning of this specification.

Figure 1a represents in axial section the interaction space which is traversed from left to right by the beam. This space is bounded at the top by a positive or anodic delay line and at the bottom by a negative or cathodic electrode. The whole arrangement is placed in a magnetic field (B) with its lines running perpendicular to the plane of the drawing and which is related to the electric field ($E_{\text{D. C.}}$) and to the speed of the electrons ($v$) by the relation.

$$v = \frac{E_{\text{D. C.}}}{B}$$

the values of the electric field and of the magnetic field being expressed in terms of harmonizing units.

If a high frequency wave is fed into the delay line, its lines of force, which are displaced in the space at the phase speed of the wave, are distributed as indicated in Figure 1a. Figure 1b then shows the equipotentials of the resulting field. It will be seen from Figure 1a that the transverse component of the H. F. field is cut off from the D. C. field in the regions between the points $b$ and $d$ around points $c$, and that it is added thereto in the regions between the points $d$ and $b$ around points $a$, so that the resulting field becomes alternately weaker (at $c$) and stronger (at $a$) than the D. C. field. If the speed of the beam in the D. C. field is equal to the ratio $E_{\text{D. C.}}/B$, the electric force acting on the electrons is balanced by the Lorentz force due to the speed of the electrons and to the magnetic field. The transverse H. F. component, alternately opposing and aiding the D. C. component, acting jointly with the magnetic field, imparts to the electrons a supplementary speed which is superimposed on the D. C. speed and which is such that the complement of the electric force is balanced by the complement of the Lorentz force. The electrons are thus retarded or accelerated depending on their position in relation to the travelling wave, as indicated by the arrows between Figures 1a and 1b. These accelerations and decelerations produce groupings of electrons in the regions symbolised by the spots G in Figure 1b around points $b$, where the transverse H. F. field component is nil and the longitudinal component is opposed to the direction of the beam. It will be seen from Figure 1b that in these regions the equipotential lines of the resulting field are directed obliquely towards the delay line, following the direction of the beam, so that the grouped electrons are subjected to a force which pushes them towards the anode without changing the longitudinal speed. They therefore lose a part of their potential energy, which is yielded to the H. F. field.

It will be assumed hereinafter that the delay line is fairly short, so that only focusing takes place, whereas the transfer of energy to the H. F. field is negligible. Figure 2 shows the shape of the focused beam in a highly diagrammatic form.

It will now be assumed that the beam thus focused by a wave $\lambda_p$ enters a second interaction space the delay line of which has such delaying characteristics that the phase speed of a wave, corresponding for example to the second harmonic $$\lambda_s = \frac{\lambda_p}{2}$$

is equal to the speed of the electrons. The excitation in this delay line of a wave of a length $\lambda_p$ is not possible if the phase speed of $\lambda_p$ in this line differs by more than 10% from the speed of the electrons, which is normally the case in consequence of dispersion. But the electrons may, for example, excite a wave of double frequency $$\lambda_s = \frac{\lambda_p}{2}$$

which will be amplified and the lines of force of the field and the equipotential lines of which are shown in Figures 3a and 3b similarly to Figures 1a and 1b. The only difference in relation to the simple amplification mechanism resides in the fact that, in Figure 1a, the interaction takes place in each cycle of the H. F. wave, while in Figure 3a it is effected in every second, or (more generally) every nth cycle of the H. F. wave, that is to say in the regions abc of Figure 3a, while there is no interaction in the regions a' b' c'.

It is obvious that, for a given primary focusing, the higher the harmonic the less good will be the focusing in the favourable regions of the field of the harmonic wave. Nevertheless, in all cases the H. F. field of the harmonic wave excited in the second section of the delay line reacts on the beam, continuing the focusing of phase started by the fundamental wave. The electrons therefore supply more and more energy to the H. F. field of the harmonic wave and move towards the anode. In other words, the primary focusing serves only to excite the harmonic wave, but the output energy is supplied principally by the D. C. component of the field in the secondary space. Approximately the same high efficiencies are therefore obtained as in tubes functioning as simple amplifiers.

One advantage of this process of multiplication consists in the fact that the output cannot react on the input. If the harmonic wave is excited in the first section, even with considerable power, it cannot modulate the beam, because, in conseqence of dispersion, the phase speed for the wave $\lambda_s$ does not coincide with the speed of the electrons. Tendency to self-oscillation is therefore greatly reduced.

The phase focusing is not influenced by the space charge effects, for the same reasons as in a tube working as a simple amplifier. As shown by Figure 2, the beam is widened at the points where the electrons accumulate, but the density of the electrons in the beam remains approximately unchanged. Even trebling of a frequency is therefore possible with good electronic efficiency.

Figures 4 to 8 illustrate diagrammatically some practical embodiments of the invention.

Figure 4 illustrates the simplest form of frequency multiplier tube in accordance with the invention. In Figure 4 the first delay line section traversed by the fundamental wave $\lambda\rho$ and intended for focusing the phase is represented at 1, and 2 is the second section, in which there is excited a harmonic wave $$\lambda_s = \frac{\lambda\rho}{n}$$

(where $n$ is the number of the desired harmonic 2, 3, . . .). The two sections are connected by a highly attenuating part 3 which serves to absorb the H. F. energy at the end of the first section and to prevent self-oscillation in the second section. The elements 1, 2, 3 are brought to the same positive potential and, since the distance between them and the negative electrode 4 is constant throughout, the phase speeds in section 1 for $\lambda\rho$ and in section 2 for $\lambda_s$ will be the same. The cathode is represented at 5 and the beam collector electrode at 6, the whole arrangement being housed in an envelope 8 placed in the magnetic field, the lines of force of which are perpendicular to the plane of the drawing.

Figure 5B:
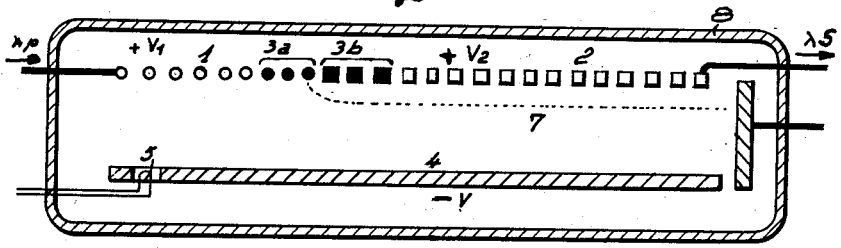

If the phase speed of $\lambda_s$ in section 2 is required to be higher than the phase speed of $\lambda\rho$ in section 1, an arrangement of the type illustrated in Figure 5a or 5b may be used. In Figure 5a, which is for the case in which the difference between these speeds is relatively small, the negative electrode is divided into two parts 4a and 4b, brought to different potentials, so that the electric field forces are different in the two interaction spaces and the speed of the beam is adapted in each space to the corresponding phase speed. At 7 is represented the equipotential line corresponding to the potential of the electrode 4a.

If the difference of the phase speeds in the two sections is not small, it may happen that the focusing of the beam will be disturbed by the crowding of the equipotential lines of the D. C. electric field opposite the gap in the negative electrode. In this case it is preferable to divide the anode into two parts which are brought to different potentials, one comprising the sections 1 and 3a and the other sections 2 and 3b, as illustrated in Figure 5b. At 7 has been shown the equipotential line corresponding to the potential $V_1$ of the first part. It will be seen that the field lines between 7 and the negative electrode do not here undergo any abrupt variation near the latter, and therefore are less disturbing to the beam, which in this region is still mainly near the negative electrode.

Figure 6:
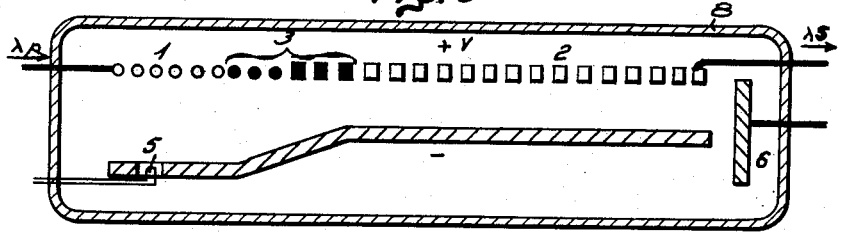

Figure 6 illustrates another embodiment in which the two interaction spaces corresponding to different phase speeds are differently connected. In Figure 6 the anode potential is the same in both sections and so the distance between the anode and the negative electrode is made different in the two sections. The figure shows a negative electrode in broken line profile but it is obvious that a straight negative electrode could be retained by disposing the two sections 1 and 2 at different heights in which case they would be connected by a highly attenuating part, the distance of which from the negative electrode would be progressively varied.

It is obvious that the different systems indicated may be combined with one another. For example, the arrangement illustrated in Figure 6 may be combined with separation either of the anode or of the negative electrode into two parts, to which slightly different potentials are applied.

Figure 7:
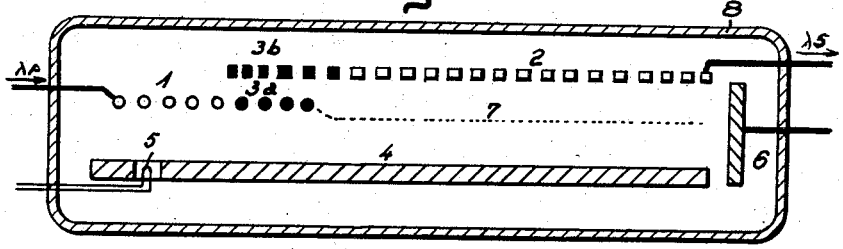

The focusing mechanism may be improved by making the distance between the section 1 and the negative electrode 4 smaller than the distance between the section 2 and the same electrode, the attenuating parts 3a and 3b being superimposed as indicated in Figure 7. It is possible to bring the electrodes 1 and 4 near one another because during the focusing the beam is still not very near the anode. This arrangement shortens the length of the tube and is favourable from the point of view of electronic optics.

Any of the embodiments above described can also be arranged to function as a self-oscillator on the fundamental wave traversing the first section, while the harmonic wave is amplified and collected at the output of the second section.

Figure 8:
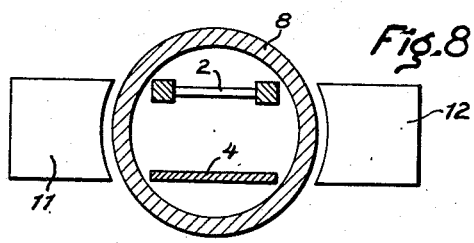

Figure 8 is a diagrammatic cross-section of a tube according to any of Figures 4 to 7, showing the pole pieces 11 and 12 of the magnetic circuit producing the necessary field.

I claim:

1. A frequency multiplier comprising a travelling wave tube having a pair of spaced parallel electrodes defining an electron and wave interaction space therebetween, means comprising a source of electrons for injecting an electron beam into said interaction space in a predetermined direction and at a predetermined velocity, means comprising terminals connected to said electrodes for applying potentials for developing in said interaction space an electric field having lines of force perpendicular to said direction of the beam, one of said electrodes serving as an anode, means for producing a magnetic field having lines of force in said interaction space perpendicular to said direction of the beam and to the lines of force of said electric field, said predetermined beam velocity being determined by the ratio of said electric to magnetic field strength, said anode being divided into two sections both having delay characteristics for the propagation of electromagnetic wave energy, means for feeding into the first section near said source of electrons wave energy having a predetermined fundamental frequency, said delay characteristics of said first section substantially equalizing the phase velocity of said wave energy at said fundamental frequency with said electric to magnetic field ratio, attenuating means disposed at the end of said first section remote from said source for absorbing the wave energy of said fundamental frequency, said delay characteristics of said second section substantially equalizing the phase velocity of a harmonic component of said wave energy with said electric to magnetic field ratio, and means coupled to the output of said second section for collecting said harmonic frequency wave energy.

2. A frequency multiplier comprising a travelling wave tube having a pair of spaced parallel electrodes defining an electron and wave interaction space therebetween, means comprising a source of electrons for injecting an electron beam into said interaction space in a predetermined direction and at a predetermined velocity, means comprising terminals connected to said electrodes for applying potentials for developing in said interaction space an electric field having lines of force perpendicular to said direction of the beam, one of said electrodes serving as an anode, means for producing a magnetic field having lines of force in said interaction space perpendicular to said direction of the beam and to the lines of force of said electric field, said predetermined beam velocity being determined by the ratio of said electric to magnetic field strength, said anode being divided into two sections both having delay characteristics for the propagation of electromagnetic wave energy, said delay characteristics being different respectively for the first and second said sections whereby for the same frequency the phase velocity of said wave energy is different in both sections, whilst said phase velocity is the same for a fundamental frequency in said first section and for a harmonic thereof in said second section, means for feeding into said first section near said source of electrons wave energy of a fundamental frequency for which said phase velocity is substantially equal to said electric to magnetic field strength ratio, attenuating means disposed at the end of said first section remote from said source for absorbing the wave energy of said fundamental frequency, and means coupled to the output of said second section for collecting said harmonic frequency wave energy.

3. A frequency multiplier as claimed in claim 2, wherein said electric to magnetic field ratio is the same along said first and second sections.

4. A frequency multiplier as claimed in claim 3, wherein the two sections of the anode are brought to the same positive potential and are disposed at the same distance from the second of said pair of electrodes.

5. A frequency multiplier as claimed in claim 1, wherein said electric to magnetic field ratio is different respectively along said first and said second sections.

6. A frequency multiplier as claimed in claim 5, wherein the two sections of the anode are brought to the same positive potential and are disposed at the same distance from the second of said pair of electrodes, said second electrode being divided into two sections brought to different potentials.

7. A frequency multiplier as claimed in claim 5, in which attenuating means are disposed at the input of said second section for absorbing the reflected wave propagating in said second section.

8. A frequency multiplier as claimed in claim 5, in which said first and said second section of said anode are respectively separated by different distances from said second of said pair of electrodes.

9. A frequency multiplier as claimed in claim 5, in which said first and said second section of said anode are respectively separated by different distances from said second of said pair of electrodes, and having attenuating means disposed at the input of said second section for absorbing the reflected wave propagating in said second section, said last attenuating means overlapping with said attenuating means terminating said first section.

10. A frequency multiplier as claimed in claim 5, wherein said two sections of the anode are brought to different potentials.

11. A frequency multiplier as claimed in claim 10, wherein said two sections of the anode are separated by the same distance from said second of said pair of electrodes.

References Cited in the file of this patent

UNITED STATES PATENTS

| | | |
|---|---|---|
| 2,414,121 | Pierce | Jan. 13, 1947 |
| 2,511,407 | Kleen et al. | June 13, 1950 |
| 2,531,972 | Doehler et al. | Nov. 28, 1950 |
| 2,541,843 | Tiley | Feb. 13, 1951 |
| 2,582,185 | Willshaw | Jan. 8, 1952 |
| 2,620,458 | Spencer | Dec. 2, 1952 |
| 2,636,948 | Pierce | Apr. 28, 1953 |
| 2,660,689 | Touraton | Nov. 24, 1953 |
| 2,680,823 | Dohler et al. | June 8, 1954 |
| 2,694,783 | Charles | Nov. 16, 1954 |
| 2,695,929 | Reverdin | Nov. 30, 1954 |

OTHER REFERENCES

Article by Warnecke, Doehler, and Bobot, pp. 279–291, Annales de Radioelectricite, for October 1950, vol. 5, No. 22.